United States Patent

Owen

[19]

[11] Patent Number: 5,900,943
[45] Date of Patent: May 4, 1999

[54] PAGE IDENTIFICATION BY DETECTION OF OPTICAL CHARACTERISTICS

[75] Inventor: Geraint Owen, Palo Alto, Calif.

[73] Assignee: Hewlett-Packard Company, Palo Alto, Calif.

[21] Appl. No.: 08/921,396

[22] Filed: Aug. 29, 1997

[51] Int. Cl.[6] .................................................. G01J 3/51
[52] U.S. Cl. ..................... 356/406; 356/407; 356/425; 250/226
[58] Field of Search .................................. 356/402, 406, 356/407, 425; 250/226

[56] References Cited

FOREIGN PATENT DOCUMENTS

| 63-20956 | 1/1988 | Japan | .................................... 356/407 |
| 6-139364 | 5/1994 | Japan | .................................... 356/406 |

*Primary Examiner*—F. L. Evans
*Attorney, Agent, or Firm*—Marc P. Schuyler

[57] ABSTRACT

This disclosure relates to a page identification system for multiple page processing systems which operates by measuring color. Detected color is compared to a look-up table that stores color characteristics for at least one known page. If a match is detected, within a tolerance selected in response to expected measurement variance, then the system produces a page identification code used in page processing. Preferably, the system is embodied in a clipboard device that automatically associates electronic data with a corresponding one of multiple pages. A stylus can be used to write on each page, and each time the stylus is used, the system automatically optically scans the page, produces a page identification code, and associates electronic data with the current page. If no match is detected in the lookup table, then the system enters a learn mode corresponding to presumed detection of a new page. Background light variations are compensated for, in part, by intensity modulating a light source at different frequencies for each of red, green and blue components, and by normalizing the detected components to adjust for total detected light. The system is expected to have utility in a wide range of paper processing systems.

19 Claims, 4 Drawing Sheets

PAGE IDENTIFICATION BY DETECTION OF OPTICAL CHARACTERISTICS

The present invention relates to the identification of and differentiation of individual pages from among multiple pages. More particularly, the present invention provides a system that identifies and distinguishes multiple pages based on detection of optical characteristics, such as color.

BACKGROUND

One problem with page processing systems, including copiers, printers, scanners, data capture and other systems, relates to the identification of individual pages and discrimination between different pages which are handled by the systems. For example, it would be useful in these types of systems to have the capability of uniquely identifying paper being processed as being a particular page, or a particular type of form. With such capability, data processing systems could process information entered on forms, using optical character recognition for example, to automatically identify and process many different types of forms despite varying locations of data fields depending on the type of form. Alternatively, pages following a paper conveyance path could be uniquely identified at different locations along the path. In copiers and other processing systems, identification of form could be utilized to detect originals, e.g., so-called "water mark verification," or to provide enhanced data processing capabilities.

One specific device suitable for automatic page identification is disclosed by U.S. Pat. No. 5,629,499, which relates to a multiple page or form digitizing clipboard; using the clipboard, a user can actually write upon multiple, stacked pages or forms, with a digitizer beneath the pages or forms capturing pen stroke information. Clearly, in such a system, association of pen stroke information with the proper one of the stacked pages or forms is important. In such a system, it would be useful to provide a mechanism for automatically detecting a current page or form being written upon, e.g., by using a mechanism which electronically "fingerprints" the page or form, and for then automatically discriminating between the different pages or forms in use.

Some prior systems do propose automatic systems for identifying pages, for example, by relying upon specially-positioned codes or marks for identifying forms or pages, which can be manually scanned by the systems themselves. However, systems of this type require the use of special forms (having the codes or marks preprinted on the page or form), as well as alignment or scanning procedures for measuring the codes or patterns; these systems generally are directed to special applications and cannot be readily used with a wide variety of applications. It would be useful to have a system that can automatically identify a page or form based on the inherent characteristics of the page or form, and which does not require specially formatted forms or code alignment procedures. Unfortunately, systems for page identification based on inherent characteristics are typically limited by difficulties in normalizing measurements, for example, by adjusting for discrepancies in ambient light, and variances in measurement distance and angle.

A definite need exists for a page identification system which can detect and differentiate pages based upon their optical characteristics. Ideally, such a system should be low-cost, adaptable to a wide variety of page processing systems (such as copiers, scanners, printers and other data processing systems), and should provide for a high degree of reliability. The present invention solves these needs and provides further, related advantages.

SUMMARY OF THE INVENTION

The present invention addresses the aforementioned needs and provides a system for page identification by optical characteristics. By directly measuring the optical characteristics of pages themselves, the present invention provides a relatively inexpensive method of uniquely identifying each page; the invention does not require precise alignment procedures or the presence of special codes on each page. As a result, the present invention has application to a wide variety of page processing systems where page identification or discrimination between different pages is useful.

One form of the invention includes a sensor that senses optical characteristics of a page, and a method of looking-up optical characteristics corresponding to a known page to detect a match. If the sensed page is recognized, an output can be generated which uniquely identifies the page, for example, a digital code identifying a particular page or type of form. Preferably, the sensor actually measures page optical characteristics in at least two different colors (e.g., in at least two different wavelengths using any type of radiation, such as visible or infrared light) using a predetermined light source, such that the effects of any ambient light may be reduced or eliminated. Further, a digital processor performs look-up by comparing measured optical characteristics with those corresponding to a known page, to determine if the characteristics closely match. How closely the measured characteristics should be required to match the criteria for a known page depends upon the application, and resolution can be improved by measuring a greater number of wavelengths, or by averaging measurements of a given page.

Preferably, the present invention is implemented using a handheld implement, which shines light onto a page to be measured, and captures reflected light for measurement of each of red, green and blue intensities. At least three colors are used to obtain a measurement of total reflected light, each color being intensity modulated at a different frequency. The reflected color components are detected and are used to normalize the measurements for at least two of the colors; normalized measurements are then used for comparison against a digital look-up table. If the implement a stylus, color measurement and page identification can be performed each time the implement is newly used, e.g., each time the tip of the stylus is newly depressed against a page.

The invention may be better understood by referring to the following detailed description, which should be read in conjunction with the accompanying drawings. The detailed description of particular preferred embodiments, set out below to enable one to build and use particular implementations of the invention, is not intended to limit the enumerated claims, but to serve as a particular example thereof.

DETAILED DESCRIPTION

The invention summarized above and defined by the enumerated claims may be better understood by referring to the following detailed description, which should be read in conjunction with the accompanying drawings. These detailed descriptions of particular preferred embodiments, set out below to enable one to build and use particular implementations of the invention, are not intended to limit the enumerated claims, but to serve as particular examples thereof.

I. INTRODUCTION TO THE PRINCIPAL PARTS

The present invention is embodied in a digital electronic clipboard 11 having special applications to page and form processing systems. U.S. Pat. No. 5,629,499 (the "'499 patent") sets forth background relating to a clipboard utilized in the preferred embodiment, is hereby incorporated in reference in its entirety, as though reproduced herein.

Figure 1:
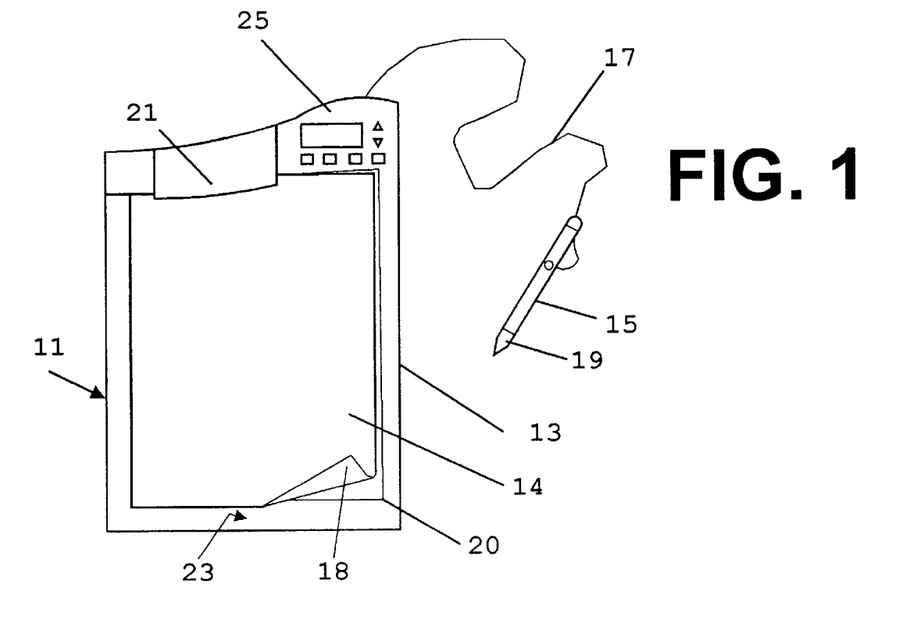
FIG. 1 shows a digital electronic clipboard which implements page identification by detection of optical characteristics; a stylus is used to mark on pages, as well as to sense optical characteristics of the page being written upon.

With reference to FIG. 1, a digital electronic clipboard 11 is illustrated as including a digitizer section 13, which supports a top page 14 (e.g., blank paper or a pre-printed document having data entry fields), a stylus 15 for writing on pages and generating electronic pen data, and a tether 17, which physically and electronically connects the stylus to the clipboard. A corner 18 of the top page is seen as "lifted" to reveal the presence of a second, bottom page 20, beneath the top page. In the context of the present invention, it is desired to provide a user with a mechanism for automatically identifying a page being written upon such that data actually written upon a page 14 or 20 is, upon being captured by the digitizer, electronically associated with the proper page; in the preferred embodiment, this mechanism is implemented using both the stylus and processing electronics (not seen in FIG. 1) located within the digitizer section 13.

The stylus 15 is fitted with an inking tip 19 which enables a user to actually write on the pages 14 and 20, such that a hard copy of the pages can be created, consistent with many conventional forms applications. Simultaneous with generation of inked, hardcopy pages, components within the pen and digitizer section 13 generate electronic position data, such that an electronic record of stylus "pen stroke" data is created and used to reproduce the completed pages. A clip mechanism 21 pins the pages to a paper supporting surface 23 of the clipboard, and a user interface section 25 is utilized by the user to input page processing commands; for example, the user can retrieve electronic files stored in memory within the clipboard corresponding to previous occasions that the clipboard was used, and add new data to those existing files. The clip mechanism 21 permits multiple forms or pages to be placed upon one another on top of the digitizer section 13, with the user switching back-and-forth between multiple, overlapping pages, to enter data on each of them.

The '499 patent, referred to above, discloses an embodiment wherein a user manually switches an active page definition to electronically associate data with a particular one of multiple pages mounted upon the clipboard 11. However, in such an embodiment, failure to utilize the user interface to switch the definition of the active page or form could potentially result in the clipboard of the '499 patent associating data with the wrong page or form.

The preferred embodiment of the present invention addresses this potential problem by using the aforementioned automatic identification mechanism, to automatically identify and switch active page definition based on detection of page color. The preferred implementation of this mechanism in a clipboard environment is illustrated in FIG. 2.

Figure 2:
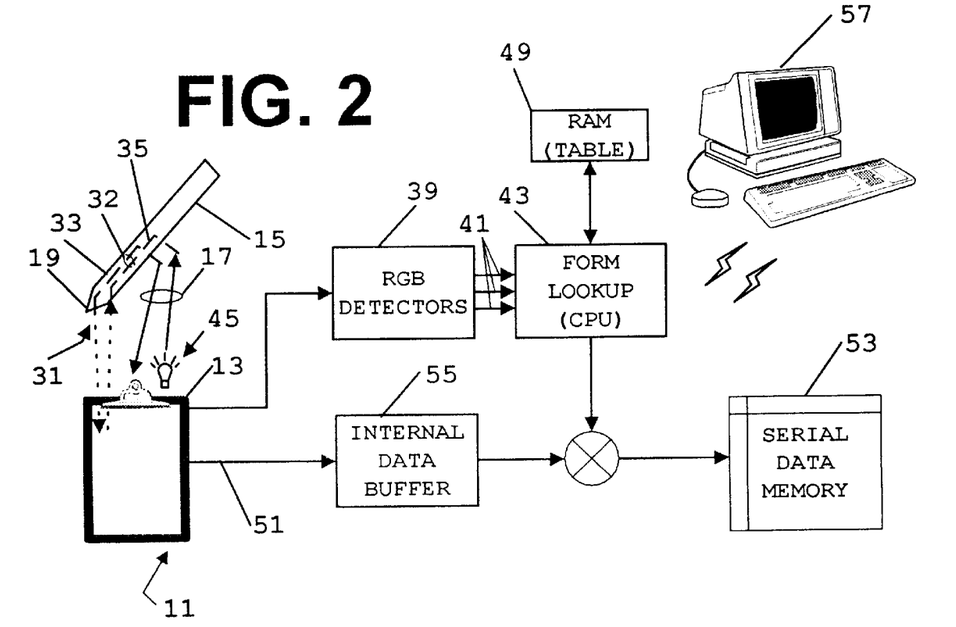
FIG. 2 is a system diagram showing major functional elements of the clipboard of FIG. 1, including the use of a stylus to sense page optical characteristics.

As seen in FIG. 2, the stylus 15 of the preferred embodiment is fitted around an optical conduit 32 which also passes through the tether 17 to convey light between the digitizer section 13 and a port 31 mounted next to the writing tip 19 of the stylus. Light is used in the preferred embodiment to periodically measure reflected optical characteristics of each page, to "fingerprint" each page, or to discriminate between pages. That is to say, the preferred embodiment measures the color of each page and uses the measured color to automatically associate electronic pen data with the proper page. Use of the terms "color," "light" and "optical characteristics," in this disclosure is to be understood to encompass measurement of reflected wavelengths of radiation, and is not limited to visible light; use of infrared wavelengths, for example, could be implemented depending upon particular application. In the preferred embodiment, however, red, green and blue shades of visible light are used, and the optical conduit is a double-stranded fiber optic cable (or two fiber optic cables 33 and 35) which conveys such light to and from the stylus, with measurement of page optical characteristics newly being performed each time the user applies the stylus to the page.

As further seen in FIG. 2, light from the tether 17 returning from the page is further provided to a set of red, green and blue ("RGB") detectors 39, which provide digital outputs 41 to a central processing unit 43. The central processing unit, as will be further described below, is controlled by firmware to normalize color information and remove certain sources of error, to perform a page lookup function, and to return an output which uniquely identifies the particular page currently being written upon. Preferably, these functions are implemented via an interrupt routine which, contemporaneous with illumination of the light source 45, is triggered by application of the writing tip 19 to a page 14 or 20.

Once the CPU 43 has compared color of the measured page against the lookup table 49, the CPU formats a code which identifies the particular page which is being written upon; the CPU inserts this code into a sequence of pen data. To this effect, the writing tip 19 preferably continually produces position information representing the relative position of the writing tip with respect to the surface of the digitizer section 13; this data is fed back as sequential analog stylus data through the tether 17, together with a signal indicating the state of a tip-down switch.

Within the digitizer section 13, the analog stylus data is digitized and formatted to represent position information of the stylus relative to the digitizer section 13, as well as a bit indicating whether the writing tip 19 is "down," signifying that the user is actually writing on a page. The formatting is either performed automatically and provided via internal data lines 51 to the CPU 43, or is formatted directly by the CPU; whichever scheme is used, the CPU preferably only passes "writings" (e.g., data produced with the writing tip 19 in the "down" state) to a serial data memory 55. Interrupt routines are also utilized to cause the CPU to insert command codes at significant places within the sequence, such as page identification and other page processing commands.

Thus, upon transition of the tip-down switch (within the stylus) to a state indicating that the writing tip 19 is pressed to the page, the CPU formats a page identification code, which it inserts as the first datum in each pen stroke sequence. As long as the writing tip continues to be depressed, all subsequent data will be associated with one page, namely, the page identified by the page identification code which began the sequence.

As an example, upon detection of a new page, the clipboard will produce a page identification code, which it inserts as the first datum in a sequence of pen data, and the sequence is fed into a serial data memory 55 within the digitizing section 13, for subsequent remote transmission to a personal computer 57, or other storage device.

With the principal parts of the preferred embodiment thus introduced, the configuration of the pen and page detection system will now be described in additional detail.

II. STYLUS CONFIGURATION AND PEN DATA

Figure 3:
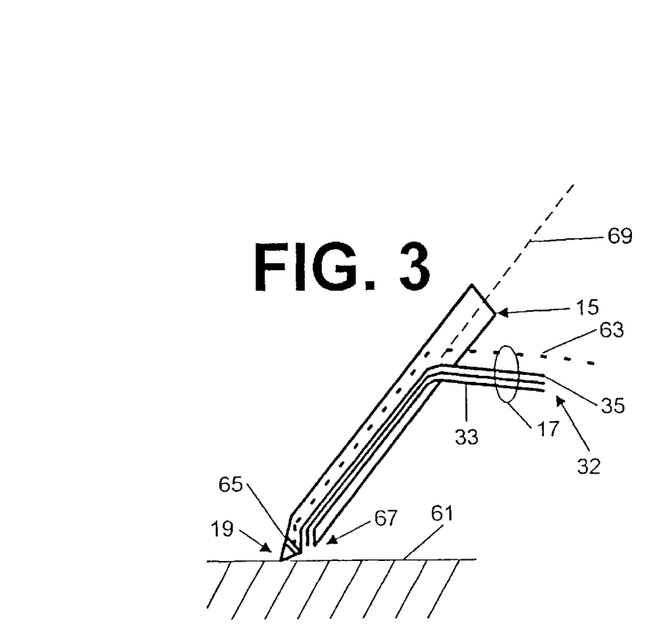
FIG. 3 is a schematic view of the stylus of FIGS. 1 and 2, and shows the use of two optical fibers for conveying source light to a writing tip of the stylus, and for conveying reflected light (indicating page characteristics) away from the writing tip; an electrical path is also indicated, for providing a tip-down signal, which triggers measurement of optical characteristics. Importantly, the optical fibers are seen as arranged so as to account for natural angles of inclination of the stylus with respect to a writing surface (with respect to the page).

The preferred stylus configuration is indicated in FIG. 3. The stylus 15 includes a pen-shaped body, which is fitted or formed about an optical conduit 32. Preferably, the optical conduit includes two fiber optic cables 33 and 35, which respectively convey light from the system's light source (not seen in FIG. 3) to be shone onto a page or paper supporting surface 61, and reflected light from the paper supporting surface back away from the page to the RGB detectors (not seen in FIG. 3); a conduit which has been found acceptable for use is a one-eighths inch model E836 cable, manufactured by "Dolan-Jenner Industries" of Lawrence, Mass. The tether 17 couples the stylus 15 to the digitizer section (also not seen in FIG. 3) to physically connect the stylus to the digitizer section, and also to convey electrical and optical signals therebetween.

In terms of electrical signals, the stylus 15 is provided with three signals from the clipboard and it provides two signals back to the clipboard, although only one of the latter, a tip-down signal 63 is indicated in FIG. 3. The signals from the digitizer section include a five volt direct current ("VDC") signal, "Vcc," ground, and a data OK signal. This data OK signal in turn illuminates a light emitting diode ("LED") on the stylus to indicate when valid data is being electronically written to the digitizer section, e.g., when the writing tip 19 is in the "tip-down" position (as indicated by a tip-down momentary contact switch 65), and the stylus is sufficiently proximity to the clipboard to register position.

Importantly, the optical conduit 32 experiences a bend 67 near the writing tip 19, to thereby direct and receive light at about a thirty degree angle relative to a longitudinal axis 69 of the stylus. The rotational orientation of the bend 67 is selected at a rotational angle relative to a natural "holding position" of the stylus (e.g., relative to the shape of the body and the location of the Data OK LED on the body, such that light from the light source is directed toward and received from the page or paper supporting surface 61 in substantially a normal direction, e.g., straight up-and-down relative to the paper supporting surface, in order to maximize collection of reflected light.

Preferably, a digitizer coding scheme is used in the digitizer section which corresponds to U.S. Pat. No. 4,806, 918 (the "'918 patent"). The '918 patent sets forth a coding scheme where individual traces carry differently timed voltage signals, and strength and relative timing of voltage pulses sensed by the stylus. The relative timing and strength of these signals, as detected at the writing tip, determines unique position of the stylus with respect to the clipboard. In this regard, the traces within the digitizer section are uniquely ordered, such that each relative pattern of timing and detected pulse strength represents only one unique position on the digitizer surface. The writing tip 19 of the stylus detects the pulses, and provides an analog (pulse) data signal to the digitizer section, together with the aforementioned tip-down signal 63. As a consequence, the stylus will always produce electronic position data when the clipboard is turned "on" and the stylus 15 is in proximity to the page or paper supporting surface 61, but it is the state of the tip-down signal 63 which indicates to the clipboard whether data is actually being written upon the page or paper supporting surface 61.

As can be seen therefore, with reference back to FIG. 1, the stylus produces analog stylus data, representing both stylus position relative to the digitizer section and whether ink is being applied to a page, but such electronic information does not by itself identify whether the top page 14 or the bottom page 20 is currently in-use.

Importantly, the writing tip 19 of the stylus preferably actually writes upon the pages 14 and 20 in black ink; while not required for implementation of the invention, black ink imparts near zero reflectance, and consequently, should not significantly skew paper color measurement.

III. PROCESSING OF COLOR DATA

With reference to FIG. 2, the RGB detectors 39 and light source 45 are preferably positioned inside of the digitizer section 13, and are processed by analog electronics for sampling and control by the CPU 43. Preferably, the light source is a single LED which simultaneously produces three color components, e.g., red, green and blue. Other light sources or associated color or wavelength detection schemes could equivalently be used, such as infrared measurement of page characteristics, but one reason for choosing visible colors of red, green and blue is convenience, e.g., packages such as the preferred, "NSTM515S" full color LED, manufactured by "Nichia" of Japan, are readily and inexpensively available. This LED produces three dominant wavelengths at 640, 525 and 470 nanometers. The full width and half maximum widths of the associated spectra are about 30 nanometers. Similarly, a single package three color photodetector can be used, which produces zero to ten volt analog signals in each of red, green and blue color channels. Selection of a particular color scheme, number of wavelengths for measurement of optical characteristics, and detector configuration is well understood and is considered within the level of ordinary skill in the art.

For purposes of power conservation, the RGB detectors 39 and light source 45 or not continuously energized, but rather are turned "on" at the transition of the tip-down switch to a state indicating that the user is beginning a stylus "pen" stroke. At that time, the CPU 43 is also interrupted, and begins a color sampling and look-up routine.

A. Modulation of Color Signals

It is expected that the preferred, clipboard application of the present page identification system will be used in the presence of visible, varying ambient light which could affect measurement of page optical characteristics. To diminish the impact of ambient light upon color measurement, the different color channels of the LED are preferably intensity modulated, such that optical characteristics of each page are preferably measured at different colors.

Figure 4:
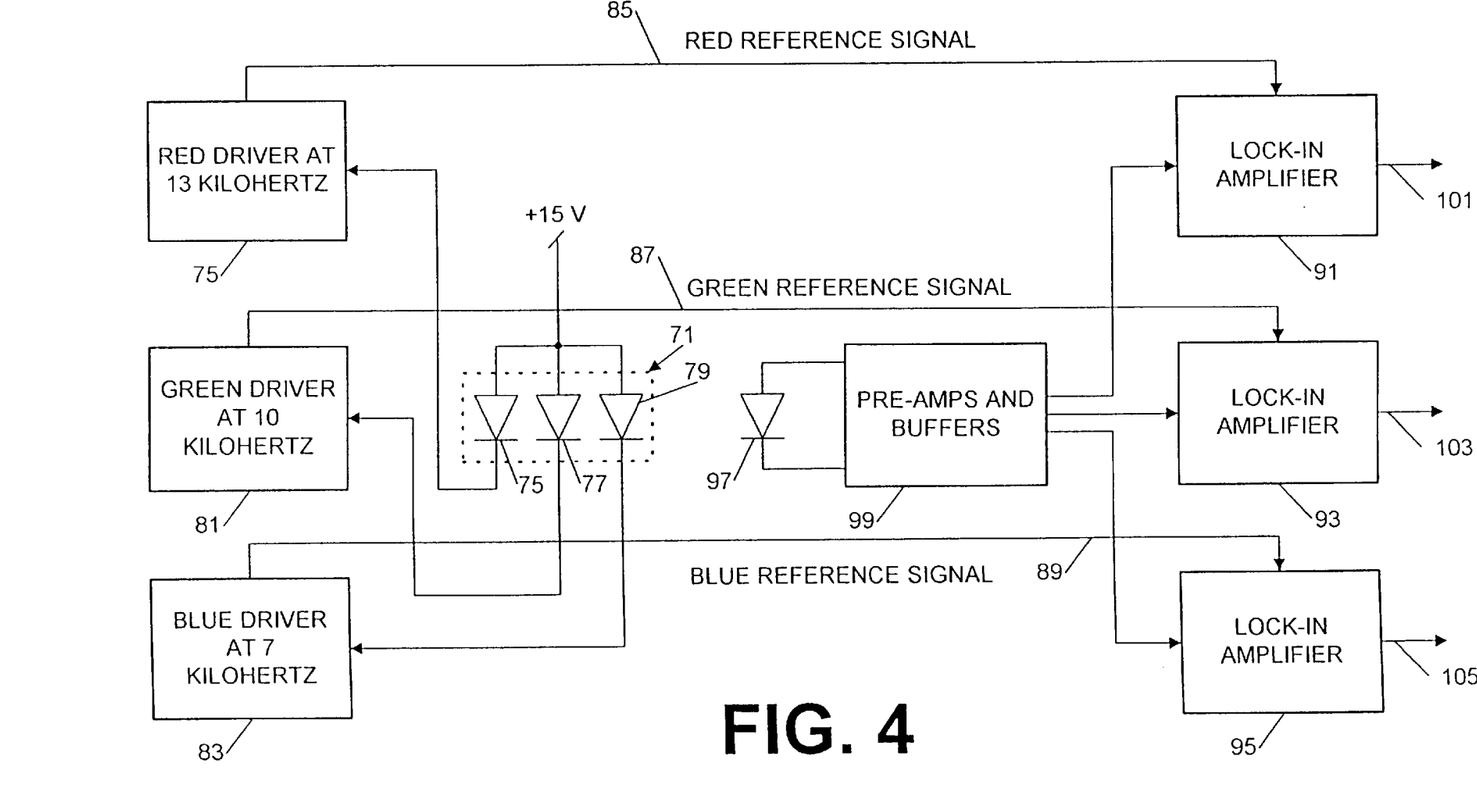
FIG. 4 is a block diagram illustrating hardware analog implementation of color detection.

In this regard, FIG. 4 illustrates a preferred color detection scheme implemented in an electronic clipboard application.

As seen in FIG. 4, a fifteen VDC supply voltage is applied to the aforementioned three channel LED (designated in FIG. 4 by the reference numeral 71). A red channel emitter 73 is intensity modulated by a red channel driver 75, at a frequency of thirteen kilohertz; similarly, green and blue channel emitters 77 and 79 are modulated by associated green and blue channel drivers 81 and 83, at ten kilohertz and seven kilohertz, respectively. The three drivers each produce a corresponding reference signal, 85, 87 and 89, which is coupled to red, green and blue channel lock-in amplifiers 91, 93 and 95. Each lock-in amplifier has internal sampling circuits, internal buffers and digital-to-analog converters (not indicated in FIG. 4) which effectively average color measurement over a small period of time, for CPU sampling. The red channel lock-in amplifier is tuned to thirteen kilohertz, the green channel lock-in amplifier to ten kilohertz, and the blue channel lock-in amplifier to seven kilohertz. Importantly, the lock-in amplifiers automatically measure intensity modulation at the frequencies to which they are tuned and thereby greatly diminish the effect of any ambient light in skewing page color detection. Use of sinusoidal intensity modulation and lock-in amplifiers are simply one modulation scheme which can be used to filter ambient light, and a large number of other schemes, for example, pulse code modulation, can also be effectively utilized to filter ambient light.

RGB detection of reflected light from a page is effected by a photodetector 97, and a set of pre-amplifiers and buffers 99 process the detected signal for passage to the lock-in amplifiers 91, 93 and 95. Concurrently with illumination of the LED 71, the CPU will have received an interrupt signal, which when processed, causes the CPU to sample the three lock-in amplifiers 91, 93 and 95, to obtain three digital outputs 101, 103 and 105.

B. Matching Color Characteristics

As mentioned previously, detected color characteristics corresponding to a page which is being written upon are compared by the CPU with a look-up table to determine if the sensed page is already "known" to the CPU; if no match is detected, after the CPU has compared the sensed page to "k" known pages, the CPU enters a learn mode and places a new entry into the look-up table, incrementing an internal pointer to "k+1" such that a subsequent comparison can include the newly learned page as well, as part of the CPU's attempt to detect a match. Matching of color characteristics of a sensed page to a known page is illustrated with reference to FIGS. 5–7.

Figure 5:
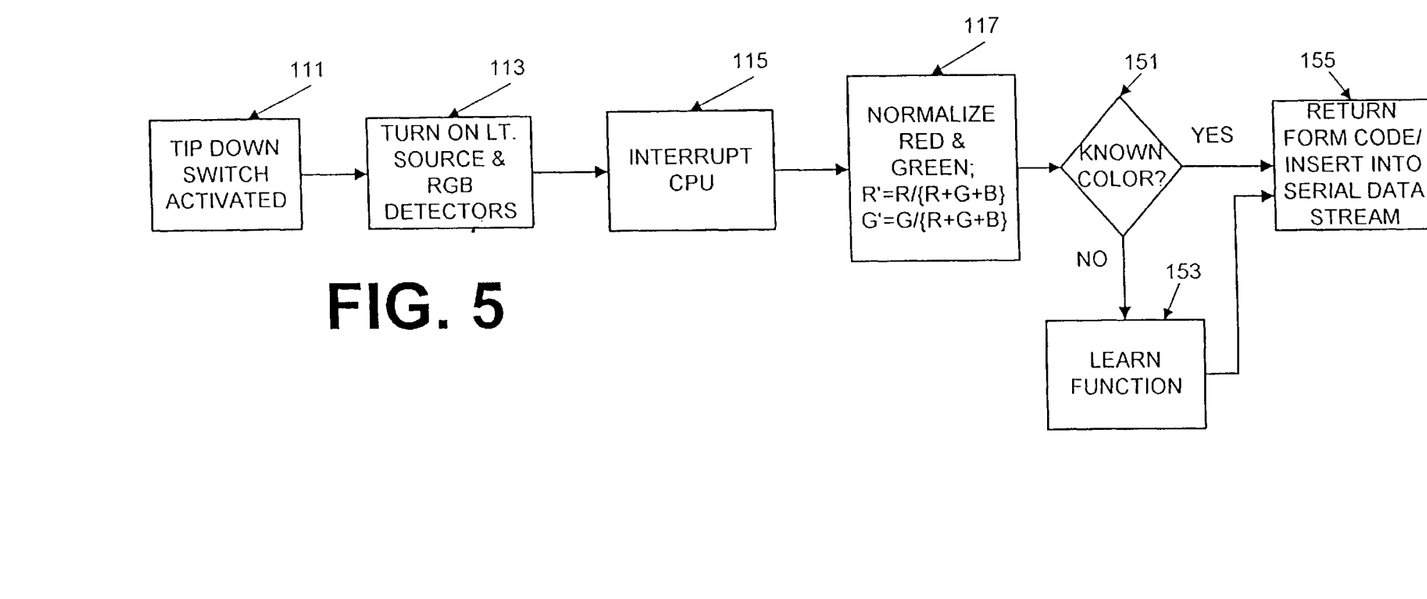
FIG. 5 is a block diagram indicating the process for performing measurement of page optical characteristics according to the present invention.

As indicated previously, logic within the clipboard detects activation of the tip-down switch, as indicated by the block 111 of FIG. 5. When this event occurs (e.g., on the downward transition of a signal which is normally tied-high to +5 VDC), logic within the digitizer section is effective to wake up the light source and RGB detectors, as indicated by block 113 of FIG. 5, and also to interrupt the CPU (designated by block 115). The CPU samples each color channel of the RGB detectors, and normalizes the red and green signals representing the sensed page.

1. Adjustment For Measurement Variance

Normalization is achieved by dividing the red and green color channels signal by the sum of all three color channel signals (R, G and B), to produce two normalized color values R' and G' (a normalized blue color channel value B' is unnecessary, since such is entirely dependent upon R' and G', e.g., 1−R'−G'=B'). The use of a greater number of wavelengths should improve resolution in distinguishing between two pages of similar color. The number of normalized values in such a case will always be one less than the number of wavelengths utilized.

Compensation for measurement variation is preferably implemented by permitting up to a selected deviation between known and sensed color, utilizing a threshold function to determine proximity between measured color and each entry in the lookup table; in other words, if sensed color and a particular "known" color are "close enough," then a match is still detected. Such measurement variation may be caused by variation in distance between writing tip and a page, and natural deviation in the angle at which different users will hold the stylus. By choosing a deviation which is sufficiently large to accommodate such variations, but not too large, a wide variety of colors can be detected and discriminated while accounting for differences in the way that users will hold the stylus.

For example, as indicated by block 117 of FIG. 5, for normalized color values, $$R' = \frac{R}{R+G+B},$$
and
$$G' = \frac{G}{R+G+B},$$

the CPU is instructed by firmware sequentially to retrieve each (known page) color in the look-up table, and to determine whether the actually measured color is within a predetermined distance of the known page color. The relation utilized for the preferred embodiments is defined by the function $$T_O \geq d = [(R'-r_O)^2 + (G'-g_O)^2]^{1/2},$$

where "$r_O, g_O$" represents the previously measured color location of a known page in the red/green color plane, and "d" is the distance between the measured color and the particular known color, as retrieved from the lookup table. If "d" is not greater than a threshold "$T_O$" (determined in relation to desired precision given the application), then the CPU detects a match between the measured page and a known page. The CPU performs the analysis for the next color in the lookup table. If no matches are detected in the entire look-up table, the machine then enters a learn mode.

Preferably, a mechanism also exists for resolving conflicts in the scheme set forth above. That is to say, if comparison of sensed color with known pages produces more than one "match," e.g., the sensed color is within the threshold for deviation from two known pages, then the software ascertains which known page the sensed page most closely resembles, and presumes that page as currently in use. In the preferred embodiment, the closest match is given by the smallest value of "d," from the formula set forth above.

Figure 6:
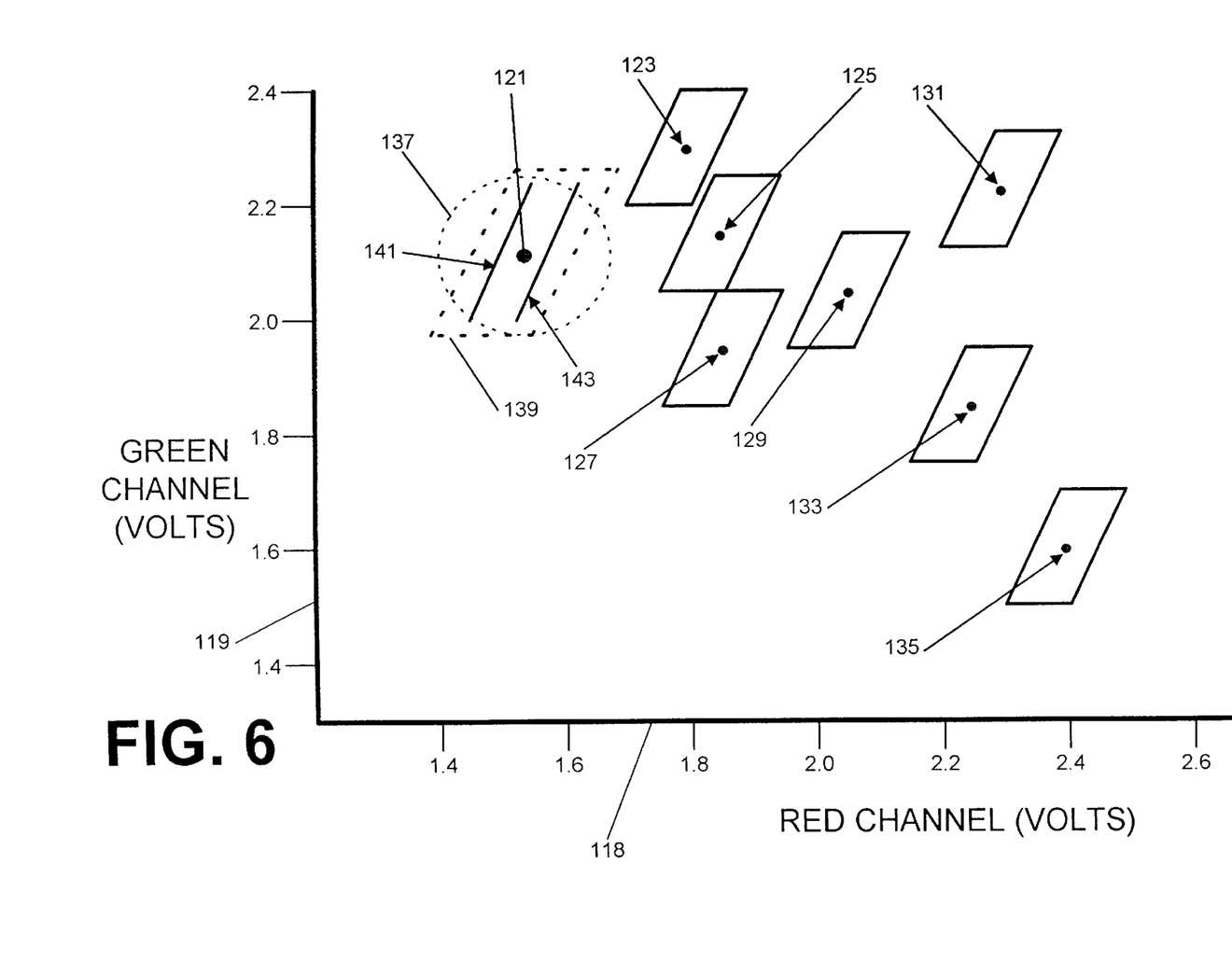
FIG. 6 is a graph illustrating typical measured optical characteristics for pages of different color, with variations accounting for typical variance in both the distance of the writing tip of FIG. 3 from page surface, and for different angles of incidence of the measured light with respect to page surface.

For example, FIG. 6 illustrates a graph corresponding to colored papers, where the "x" axis 118 represents red channel analog strength in volts, and the "y" axis 119 represents green channel analog strength in volts. Values along the "x" axis are proportional to R', and values along the "y" axis are proportional to G'. Each of eight points are indicated, corresponding to pages which are particular shades of blue 121, green 123, light green 125, grey 127, white 129, yellow 131, pink 133 and red 135. Applying the threshold function indicated above to determine if sensed color differs from each known color by less than "$T_O$" results in a search within a circular area 137 of the red-green color plane; if a sensed page lies within this circle (of radius "$T_O$"), then a match is detected. While this search scheme is easy to implement, it is not necessarily the most accurate or the most rapid given the preferred clipboard environment.

For example, FIG. 6 also indicates a polygonal search area 139 which more accurately represents typical measurement variance for a given page. For example, for a hypothetical color of blue, represented by point 121 of FIG. 6, a plotting of sensed color for a measurement inclination of thirty degrees and a typical variance of measurement distance (between the optical port of the stylus and a page) of between five and nine millimeters takes the form of a line 141 indicated in FIG. 6. Similarly, for relative inclination of zero degrees and a measurement deviation of between five and nine millimeters, a corresponding plot takes the form of line 143 of FIG. 6. Thus, a polygon such as a parallelogram 139 formed about the "known" color blue should accurately account for measurement variations.

It should be understood that the search regions indicated in FIG. 6 are exaggerated in size, for purposes of explanation, and that in practice, the search region will occupy a much smaller area in the red-green or other selected color plane than is illustrated in FIG. 6, such that differentiation can generally be easily made between two similar colors. Also, analysis of more than three wavelengths to detect page optical characteristics should further improve resolution if highly detailed resolution is desired.

In FIG. 6, the R' and G' values are represented by analog voltages. For example, the blue color 121 corresponds to an "x" value of 1.55 VDC and a "y" value of 2.10 VDC. For subsequent signal processing, it is more convenient to convert these analog voltages into digital form. For example, if 10.0 VDC is taken to be equivalent to a maximum value representable by sixteen bits (e.g., 65,536), the "x" and "y" values become 1.55×65,536÷10, or 10,158, and 2.10×65,536÷10, or 13,762, respectively.

Figure 7:
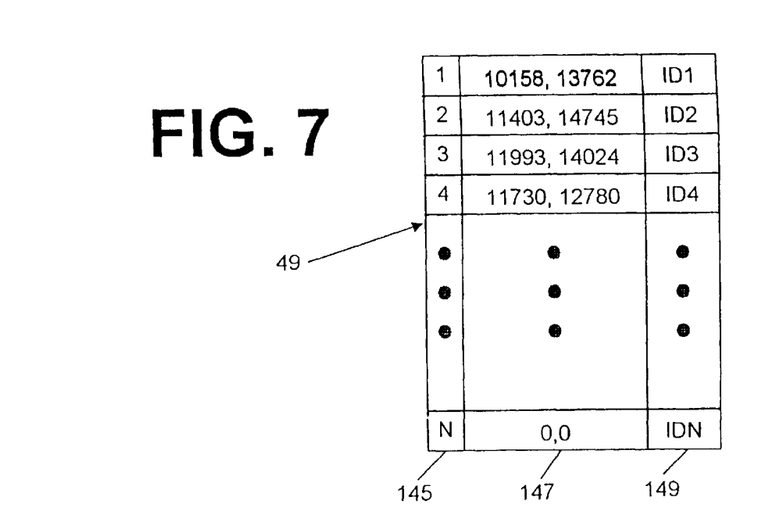
FIG. 7 shows sample sixteen bit values of a look-up table, representing expected color values for "known" pages seen in FIG. 6.

A hypothetical lookup table 49 is indicated in FIG. 7, with each entry defined by a pointer 145, a set of digitized color coordinates 147, and a digital ID code 149 for insertion into the stylus data stream. For example, assuming that four pages are "known" to the clipboard, having sixteen bit (red,green) coordinate values of (10158,13762) and (11403, 14745), (11993,14024) and (11730,12780) (respectively corresponding to points 121, 123, 125 and 127 of FIG. 6), the CPU will apply test a first point (10158,13762) to determine whether the measured color lies within a defined range of that point. If a match is detected, the CPU will access a form ID command 149 corresponding to the particular page. If no match is detected, the CPU will preform the same analysis for the second point (10158,13762). If still no match is detected after four such tries, the CPU will open a new memory slot and load the newly measured color into memory, together with a new page ID code. Simultaneously, the CPU will increment an internal point (e.g., to "5") which defines the number of known pages.

C. Insertion of Data Into The Data Stream

As indicated in FIG. 5, the CPU determines whether a sensed color is "known" to the CPU (designated by reference block 151), and if it is not, then the CPU enters a learn function (block designated by the reference numeral 153). However, either way, the CPU completes its interrupt routing by selecting a page ID code, which it inserts into the serial data stream from the stylus, as indicated by the reference numeral 155 of FIG. 5. Upon insertion of the code, the CPU resets its interrupt and enters normal program mode, where it either processes stylus data or executes certain user commands entered via the user interface. Such commands could be to select a known form from memory, for example, a particular class of shipping invoices having a particular color, or to transmit stored data to a remote computer. In such an application, a user might operate the user interface to recall a half completed page from memory, and upon newly writing on the form, the CPU stores in memory internal to the clipboard stylus "pen" stroke data which is preceded by a digital ID code which identifies the type of form or the page.

There are many methods that will occur to those of ordinary skill in the art for improving resolution of measured color. By "improving resolution," it is meant that methods exist for reducing variance in detected color, such that measured color will very nearly match one of the entries in the lookup table. For example, color could be measured by averaging several measurements together. Alternatively, the stylus could be made to have a port that directly contacts the surface of the page, such as to eliminate measurement variances, such as distance to paper or stylus incidence angle. Other additional techniques for processing color to obtain an accurate result will also occur to those having ordinary skill in the art. Such techniques are not excluded from the scope of the present invention, and may be more or less desirable depending upon the particular application being considered.

IV. USE OF SPECIAL, MULTI-PAGE FORMS IN A CLIPBOARD

In the preferred, electronic clipboard application, page identification is preferably kept simple to heighten accuracy, by normally using predetermined, multi-colored forms. As an example, a four page form could be made to always feature a first-blue page, a second-grey page, a third-red page, and a fourth-orange page. In such an application, the page identification scheme according to the present invention permits automatic detection of each page as a user writes on each page, and separates stylus information onto an electronic equivalent of each page. As a result, a file of all such information can be stored and the exact, completed form can be later combined with image information representing the original, pre-printed form, and be reproduced exactly.

It should be apparent that the present invention is neither limited to the environment of a digitizing electronic clipboard nor is it limited to use of multi-part forms having very different colors. Using the principles of the present invention, it should be possible to identify colors which appear nearly identical to the human eye, and achieve page identification with a high degree of confidence as to accuracy.

Having thus described several exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

I claim:

1. In a page handling system that receives and distinguishes different pages, at least one page having a particular color associated therewith and adapted for having printed material thereon, a page identification system adapted to identify one page from amongst multiple pages according to the associated color, comprising:

a light source adapted to direct light onto at least one of the multiple pages;

a light detector adapted to sense light from the at least one of the multiple pages, the light detector producing an electronic output representing detected light;

a look-up table adapted to store color characteristics of at least one known page;

a processor that compares detected light as represented by the electronic output with the color characteristics, to detect a match between the detected light and the color characteristics of a known page, and if a match is detected, that provides an electronic output identifying that the match has occurred; and means for learning new pages if a match is not detected, and for storing color characteristics of the new page in the look-up table such that the new page can be subsequently identified as a known page;

wherein the page processing system may thereby distinguish and subsequently track at least one of the multiple pages based on color.

2. A page identification system according to claim 1, wherein the light source produces light in at least two different wavelengths.

3. A page identification system according to claim 1, wherein the light source produces light in at least three different wavelengths.

4. A page identification system according to claim 1, further comprising means for accommodating variation in measurement distance between the multiple pages and at least one of the light source and the light detector.

5. A page identification system according to claim 1, wherein the light from the light source is shone onto a predetermined side of the multiple pages and wherein the light detector receives light which has been reflected from the predetermined side.

6. A page identification system according to claim 5, further comprising means for accommodating variation in incidence angle of light which has been reflected from the predetermined side.

7. A page identification system according to claim 5, wherein the light source is a modulated light source that provides light having intensity modulated according to a predetermined pattern.

8. A page identification system according to claim 7, wherein the light source produces light of multiple wavelengths, each wavelength being intensity modulated at a different pattern.

9. A page identification system according to claim 1, wherein:

said page identification system further comprises at least one a defined tolerance region;

the processor is controlled by one of software and firmware to detect a match based upon difference between detected color and color characteristics stored in the look-up table which falls within the tolerance region.

10. A page identification system according to claim 1, further comprising means for normalizing light intensity in a measured wavelength according to total light.

11. A page identification system according to claim 1, further comprising one of firmware and software that implements a learn function, such that if no match is detected between detected light and color characteristics of the multiple pages, then color characteristics corresponding to the detected light are stored in the look-up table as a new entry.

12. A page identification system according to claim 1, wherein the page handling system associates with at least one particular page electronic data representing printed material unique to that particular page, said page handling system further comprising means for electronically associating the electronic data with a color unique to the particular page.

13. A page identification system adapted to identify one page from amongst multiple pages according to page color, comprising:

a light source adapted to direct light onto at least one of the multiple pages;

a light detector adapted to sense light from the at least one of the multiple pages, the light detector producing an electronic output representing detected light;

a look-up table adapted to store color characteristics of at least one known page; and a processor that compares detected light as represented by the electronic output with the color characteristics, to detect a match between the detected light and the color characteristics of a known page, and if a match is detected, that provide an electronic output identifying that the match has occurred;

a wand adapted for manual scanning of a page surface by a user;

a base unit that houses the light source and the light detector;

at least one optical fiber for coupling light between the base unit and the wand.

14. A page identification system according to claim 13, wherein:

the wand includes a writing tip adapted to contact a page surface and a tip-down switch that provides an electronic indication when the writing tip is in contact with the page surface; and said page identification system is responsive to the electronic indication to sample color from the page surface.

15. A page identification system according to claim 14, wherein:

the wand includes an optical port, the optical port oriented so as to receive reflected light from the page surface in a substantially normal direction from the page surface in response to a normal writing inclination angle.

16. A page identification system according to claim 13, wherein:

the wand produces a stream electronic stylus data;

the processor, in response to the match, produces a form identification code and inserts the code into the stream of electronic stylus data.

17. A page identification system adapted to identify one page from amongst multiple pages according to page color, comprising:

a light source adapted to direct light onto at least one of the multiple pages;

a light detector adapted to sense light from the at least one of the multiple pages, the light detector producing an electronic output representing detected light;

a look-up table adapted to store color characteristics of at least one known page;

a processor that compares detected light as represented by the electronic output with the color characteristics, to detect a match between the detected light and the color characteristics of a known page, and if a match is detected, that provide an electronic output identifying that the match has occurred; and a tolerance region which is substantially circular or polygonal in a color plane;

wherein the processor is controlled by one of software and firmware to detect a match based upon difference between detected color and color characteristics stored in the look-up table which falls within the tolerance region.

18. A system, comprising:

an electronic clipboard having a digitizer section and a stylus which is tethered to the digitizer section, the digitizer section adapted to support multiple pages and the stylus and digitizer adapted to generate a data stream corresponding to stylus strokes upon the multiple pages;

a page identification system for distinguishing between the multiple pages and associating data within the data stream individual ones of the multiple pages, the page identification system including a light source adapted to direct light onto at least one of the multiple pages, a light detector adapted to sense light from the at least one of the multiple pages, the light detector producing an electronic output representing detected light, a look-up table adapted to store color characteristics of the multiple pages, and a processor that compares detected light as represented by the electronic output with the color characteristics, to detect a match between the detected light and the color characteristics of one page, and if a match is detected, that provide an electronic output identifying that the match has occurred; and a mechanism associated with the clipboard and responsive to the electronic output for inserting a page identification code into the data stream, such that a subset of data within the data stream is automatically associated with an intended one of the multiple pages, notwithstanding that the user switches between writing upon different ones of the multiple pages.

19. In a processing system that handles different physical pages, wherein each page is made of a material having a particular color and has associated electronic data, a page identification system adapted to identify one page from amongst multiple pages according to page color without, comprising:

a light source adapted to direct light onto at least one of the multiple pages;

a light detector adapted to sense light from the at least one of the multiple pages, the light detector producing an electronic output representing detected light;

a look-up table adapted to store color characteristics of at least one known page;

a processor that compares detected light as represented by the electronic output with the color characteristics, to detect a match between the detected light and the color characteristics of a known page, and that provides, if a match is detected, an electronic output identifying that the match has occurred, and learns new pages if a match is not detected, by storing color characteristics of the new page in the look-up table such that the new page can be subsequently identified as a known page;

wherein the electronic output responsively causes association of at least some electronic data with the processing system may thereby distinguish and treat the different pages based on color.

* * * * *